(12) United States Patent
Onishi (10) Patent No.: US 10,793,408 B2
(45) Date of Patent: Oct. 6, 2020

(54) STAND-UP RIDING TYPE CARGO HANDLING VEHICLE

(71) Applicant: MITSUBISHI LOGISNEXT CO., LTD., Kyoto (JP)

(72) Inventor: Mariko Onishi, Kyoto (JP)

(73) Assignee: MITSUBISHI LOGISNEXT CO., LTD., Kyoto (JP)

( * ) Notice: Subject to any disclaimer, the term of this patent is extended or adjusted under 35 U.S.C. 154(b) by 343 days.

(21) Appl. No.: 15/770,755

(22) PCT Filed: Aug. 31, 2017

(86) PCT No.: PCT/JP2017/031351
§ 371 (c)(1),
(2) Date: Apr. 25, 2018

(87) PCT Pub. No.: WO2018/088000
PCT Pub. Date: May 17, 2018

(65) Prior Publication Data
US 2020/0239293 A1    Jul. 30, 2020

(30) Foreign Application Priority Data

Nov. 9, 2016    (JP) .................................. 2016-218621

(51) Int. Cl.
*B66F 9/24*        (2006.01)
*B66F 9/075*       (2006.01)
(Continued)

(52) U.S. Cl.
CPC .............. *B66F 9/24* (2013.01); *B66F 9/0755* (2013.01); *B60Y 2200/15* (2013.01); *B66F 9/22* (2013.01);
(Continued)

(58) Field of Classification Search
CPC .... B66F 9/22; B66F 9/23; B66F 9/075; B66F 9/06; B66F 17/003; B60Y 2200/15; G05D 22/02
(Continued)

(56) References Cited

U.S. PATENT DOCUMENTS 2,065,354 A    12/1936  Streen
7,331,167 B1 *  2/2008  Drake .................... A01D 34/62
                                                    56/10.2 G
(Continued)

FOREIGN PATENT DOCUMENTS

CN    101574981    11/2009
CN    201406302     2/2010
(Continued)

OTHER PUBLICATIONS

"International Preliminary Report on Patentability of PCT/JP2017/031351; this report contains the following items :Form PCT/IB/338,PCT/IB/326, PCT/IB/373, PCT/ISA237(cover sheet), PCT/ISA237(Box No. I), PCT/ISA237(Box No. V)", dated May 23, 2019, which is English translation of "Written Opinion of the International Searching Authority", p. 1-p. 12.
(Continued)

*Primary Examiner* — Tan Q Nguyen
(74) *Attorney, Agent, or Firm* — JCIPRNET (57) ABSTRACT

Provided is a stand-up riding type cargo handling vehicle capable of reliably preventing traveling with the foot of an operator kept protruding outside a vehicle. The stand-up riding type cargo handling vehicle includes a boarding floor which an operator boards; a first foot pedal and a second foot pedal that are provided on the boarding floor, and a control unit that is connected to the first and second foot pedals. The first foot pedal is disposed at a position corresponding to the left foot of the operator who gets aboard facing forward; the (Continued)

second foot pedal is disposed at a position corresponding to the right foot of the operator who gets aboard facing forward, and is divided into a front foot pedal and a rear foot pedal in a forward/backward direction; and the front and rear foot pedals are separated by a predetermined amount in the forward/backward direction. The control unit permits or prevents traveling of the cargo handling vehicle on the basis of a state in which the first foot pedal, the front foot pedal, and the rear foot pedal are stepped on; and the control unit permits a hydraulic operation of the cargo handling vehicle in a case in which the front foot pedal is stepped on, and prevents the hydraulic operation in cases other than this case.

12 Claims, 7 Drawing Sheets

(51) Int. Cl.
   *G05D 22/02* (2006.01)
   *B66F 9/22* (2006.01)
   *B66F 17/00* (2006.01)

(52) U.S. Cl.
   CPC .... *B66F 17/003* (2013.01); *G05D 2201/0216* (2013.01)

(58) Field of Classification Search
   USPC .......................................................... 701/50
   See application file for complete search history.

(56) References Cited

U.S. PATENT DOCUMENTS

| 7,481,291 | B2* | 1/2009 | Nishikawa | B62K 17/00 |
| | | | | 180/181 |
| 2014/0005858 | A1 | 1/2014 | Miller et al. | |
| 2014/0188338 | A1* | 7/2014 | Ito | B62D 51/02 |
| | | | | 701/41 |
| 2016/0122978 | A1 | 5/2016 | Matsu et al. | |

FOREIGN PATENT DOCUMENTS

| CN | 105857074 | 8/2016 |
| DE | 102012013009 | 1/2014 |
| EP | 2679431 | 1/2014 |
| JP | S6171241 | 4/1986 |
| JP | H0826695 | 1/1996 |
| JP | 2002316799 | 10/2002 |
| JP | 2014001026 | 1/2014 |
| JP | 5873909 | 3/2016 |
| JP | 6214017 | 10/2017 |

OTHER PUBLICATIONS

"Office Action of China Counterpart Application," dated Feb. 3, 2019, with English translation thereof, p. 1-p. 12.
"Search Report of Europe Counterpart Application", dated Jun. 23, 2020, pp. 1-7.

* cited by examiner

BASIC POSTURE

FIG. 5(A)

ADEQUATE SIDEWISE RIDING POSTURE

FIG. 5(B)

INADEQUATE SIDEWISE RIDING POSTURE

STAND-UP RIDING TYPE CARGO HANDLING VEHICLE

CROSS-REFERENCE TO RELATED APPLICATION

This application is a 371 application of the International PCT application serial no. PCT/JP2017/031351, filed on Aug. 31, 2017, which claims priority benefits of Japan Patent Application No. 2016-218621 filed on Nov. 9, 2016. The entirety of each of the above-mentioned patent applications is hereby incorporated by references herein and made a part of this specification.

TECHNICAL FIELD

The present invention relates to a stand-up riding type cargo handling vehicle having a function of detecting boarding of an operator.

BACKGROUND ART

As an example of a conventional stand-up riding type cargo handling vehicle, a reach type forklift including a boarding floor which an operator boards, first and second foot pedals that are provided on the boarding floor, and a control unit that is connected to the first and second foot pedals is known. The first and second foot pedals are disposed at positions corresponding to the left and right feet of the operator who gets aboard facing forward. The control unit is configured to permit traveling of the forklift only when both of the first foot pedal and the second foot pedal are stepped on (e.g., see Patent Literature 1).

Figure 8A:
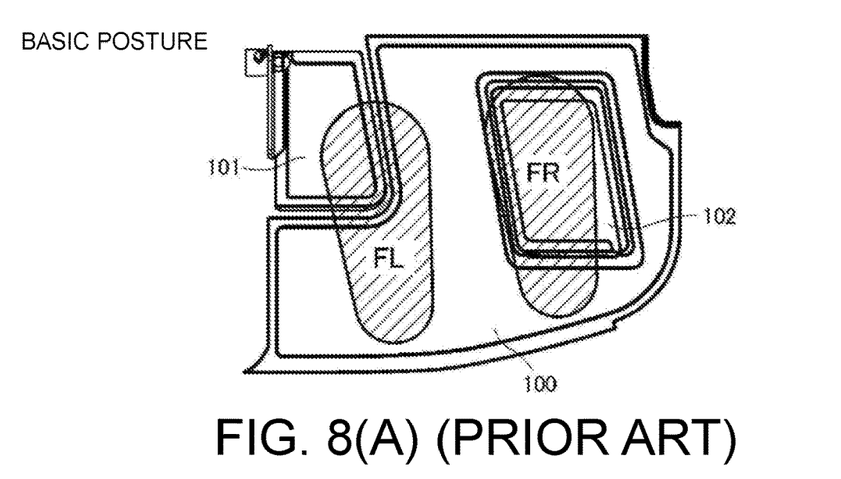
FIG. 8(A) illustrates a positional relation when the operator assumes a basic posture.

When the operator gets aboard forward, that is, when the operator assumes a basic posture, the first foot pedal 101 and the second foot pedal 102 that are provided on the boarding floor 100 and the right foot FR and the left foot FL of the operator have a positional relation illustrated in FIG. 8(A).

CITATION LIST

Patent Literature

[Patent Literature 1]
Japanese Patent No. 5873909

SUMMARY OF INVENTION

Technical Problem

Figure 8B:
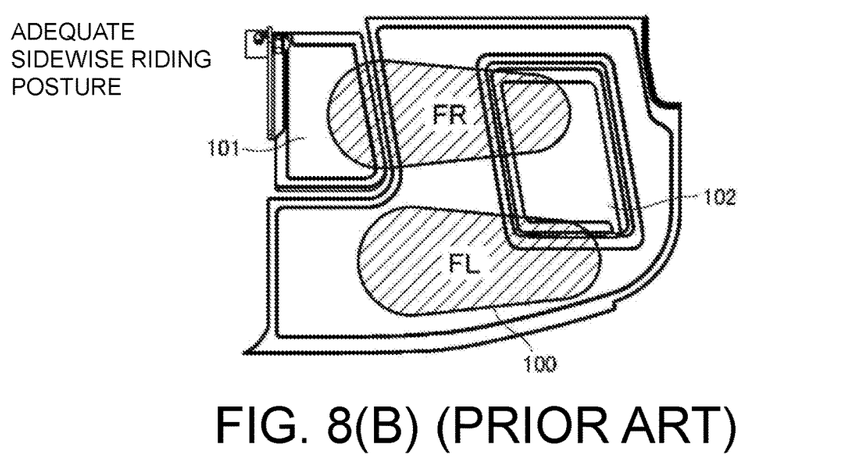
FIG. 8(B) illustrates a positional relation when the operator assumes an adequate sidewise riding posture.
Figure 8C:
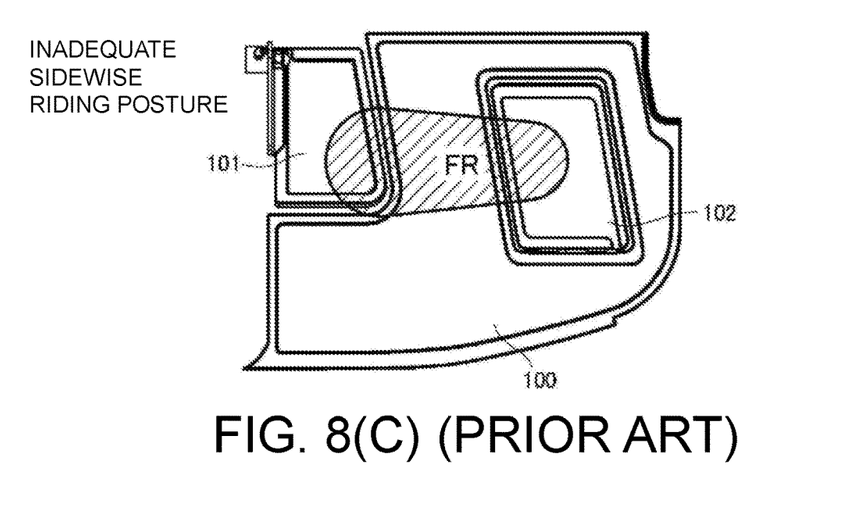
FIG. 8(C) illustrates a positional relation when the operator assumes an inadequate sidewise riding posture.

Meanwhile, in the stand-up riding type cargo handling vehicle, the operator may assume a so-called sidewise riding posture in which the operator gets aboard facing leftward rather than facing forward in order to efficiently perform cargo handling work (see FIG. 8(B)). In this case, in the conventional forklift described in Patent Literature 1, since both of the first foot pedal 101 and the second foot pedal 102 can be stepped on by one foot (the right foot FR) alone (see FIG. 8(C)), the forklift can travel with the other foot (the left foot FL) kept protruding outside the vehicle. This traveling is very dangerous.

The present invention was made in view of the above circumstances, and an object thereof is to provide a stand-up riding type cargo handling vehicle capable of reliably preventing traveling with a foot of an operator kept protruding outside the vehicle.

Solution to Problem

To solve the problem, a stand-up riding type cargo handling vehicle according to the present invention is a cargo handling vehicle including a boarding floor which an operator boards, first and second foot pedals that are provided on the boarding floor, and a control unit that is connected to the first and second foot pedals. The first foot pedal is disposed at a position corresponding to a left foot of an operator who gets aboard facing forward, and the second foot pedal is disposed at a position corresponding to a right foot of the operator who gets aboard facing forward, and is divided into a front foot pedal and a rear foot pedal in a forward/backward direction. Furthermore, the front foot pedal and the rear foot pedal are separated by a predetermined amount in the forward/backward direction, and the control unit permits or prevents traveling and a hydraulic operation of the cargo handling vehicle on the basis of a state in which the first foot pedal, the front foot pedal, and the rear foot pedal are stepped on.

The control unit of the cargo handling vehicle may be configured to permit the hydraulic operation in a case in which the front foot pedal is stepped on and to prevent the hydraulic operation in cases other than this case. The control unit of the cargo handling vehicle may be configured to permit traveling in a case in which all of the first foot pedal, the front foot pedal, and the rear foot pedal are stepped on, and to prevent the traveling in cases other than this case.

The front and rear foot pedals of the cargo handling vehicle may be pivotable relative to the boarding floor due to hinges, each of which has a rotational axis extending in a leftward/rightward direction.

In this case, the following four aspects may be conceived.
(1) An aspect in which a hinge is provided at a front portion of the front foot pedal, and another hinge is provided at a rear portion of the rear foot pedal.
(2) An aspect in which a hinge is provided at a rear portion of the front foot pedal, and another hinge is provided at a front portion of the rear foot pedal.
(3) An aspect in which hinges are respectively provided at front portions of the front foot pedal and the rear foot pedal.
(4) An aspect in which hinges are respectively provided at rear portions of the front foot pedal and the rear foot pedal.

Advantageous Effects of Invention

According to the present invention, a stand-up riding type cargo handling vehicle capable of reliably preventing traveling with a foot of an operator kept protruding outside the vehicle can be provided.

BRIEF DESCRIPTION OF DRAWINGS

FIGS. 3(A) and 3(B) are views of a boarding floor and its surroundings of the cargo handling vehicle according to the embodiment of the present invention wherein FIG. 3(A) is a top view, and FIG. 3(B) is a perspective view.

FIGS. 5(A)-5(C) are views illustrating a positional relation between a foot of an operator and three pedals in the cargo handling vehicle according to the embodiment of the present invention, wherein

FIGS. 8(A)-8(C) are views illustrating a positional relation between a foot of an operator and two pedals in a conventional cargo handling vehicle, wherein

DESCRIPTION OF EMBODIMENTS

Hereinafter, an embodiment and a modification of a cargo handling vehicle according to the present invention will be described with reference to the attached drawings. In each of the drawings, an arrow X indicates a forward/backward direction, an arrow Y indicates a leftward/rightward direction, and an arrow Z indicates an upward/downward direction.

[Embodiment]

Figure 1:
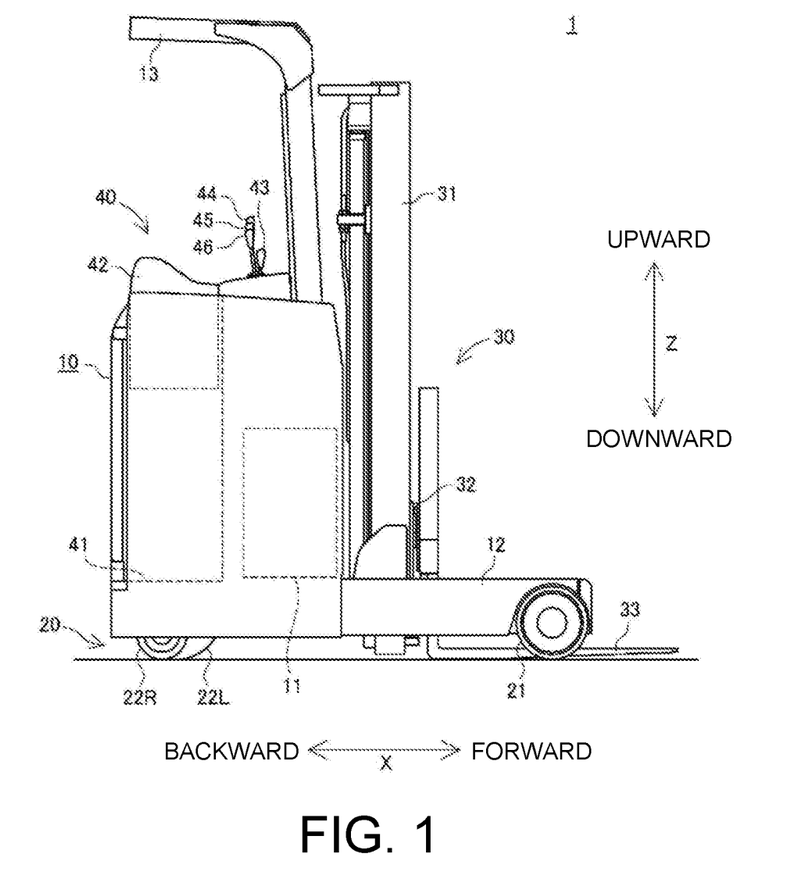
FIG. 1 is a side view of a cargo handling vehicle according to an embodiment of the present invention.
Figure 2:
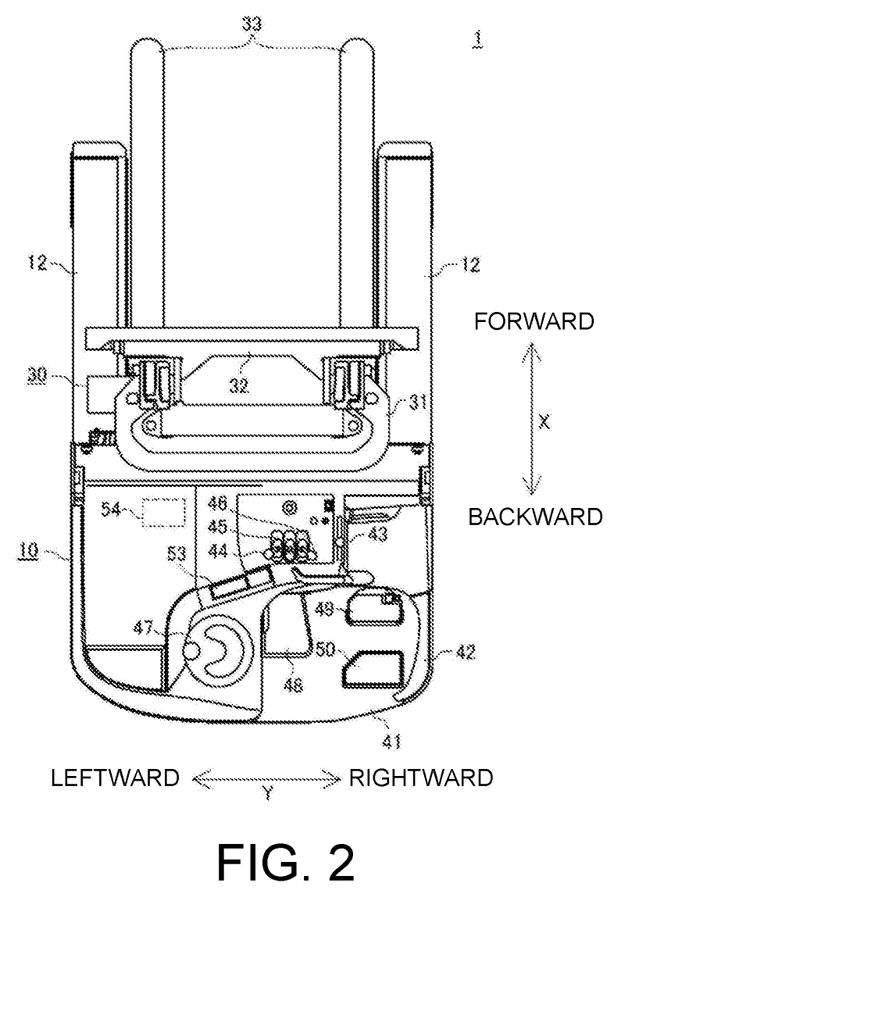
FIG. 2 is a top view of the cargo handling vehicle according to the embodiment of the present invention.

As illustrated in FIGS. 1 and 2, a stand-up riding type cargo handling vehicle 1 according to the present embodiment is a reach type forklift that includes a vehicle main body 10, a traveling device 20, and a cargo handling device 30.

The vehicle main body 10 has a battery storage 11, straddle legs 12, and an overhead guard 13. The battery storage 11 stores a battery (not shown) that is a drive source for the traveling device 20 and the cargo handling device 30. The straddle legs 12 jut out from the vehicle main body 10 to the front to sandwich the cargo handling device 30 from the right and left. The overhead guard 13 protects an operator from falling objects (not shown). In FIG. 2, the overhead guard 13 is not illustrated.

The traveling device 20 has two front wheels 21, two rear wheels 22L and 22R having different diameters, a traveling motor (not shown), and a steering device. The front wheels 21 are driven wheels that are provided at the straddle legs 12 and are rotated in association with the traveling of the vehicle main body 10. The rear wheel 22L is a driving and steering wheel that is provided behind the front wheels 21. The rear wheel 22R is a driven wheel that is provided at an interval from the rear wheel 22L in the leftward/rightward direction Y and is rotated in association with the traveling of the vehicle main body 10. The traveling motor generates power for driving the rear wheel 22L that is the driving wheel. The steering device changes a direction of the rear wheel 22L that is the steering wheel.

The cargo handling device 30 has a mast 31, a lift bracket 32, forks 33, and a cargo handling hydraulic motor (not shown). The mast 31 is a two-stage mast that is disposed in the front of the vehicle main body 10. The lift bracket 32 is provided to be liftable relative to the mast 31. The forks 33 are for supporting a pallet (not shown) on which a cargo is stacked, and are attached in the front of the lift bracket 32. The cargo handling hydraulic motor generates power that at least extends the mast 31 and power that at least lifts the lift bracket 32. Further, the cargo handling hydraulic motor generates power that tilts the mast 31 and power that moves (allows of reaching) the mast 31, the lift bracket 32, and the forks 33 in the forward/backward direction X.

The vehicle main body 10 further has a cab 40 that includes a boarding floor 41, a cushion pad 42, an accelerator lever 43, a lift lever 44, a tilt lever 45, a reach lever 46, and a steering wheel 47. The boarding floor 41 constitutes a floor of the cab 40. The cushion pad 42 is disposed at upper and right sides of the boarding floor 41, and supports the hips or the like of the operator on the boarding floor 41. The accelerator lever 43 is a lever for a traveling operation, which is for driving the rear wheel 22L. That lift lever 44 is a lever for a cargo handling operation, which is for lifting/lowering the forks 33. The tilt lever 45 is a lever for a cargo handling operation, which is for changing a tilt angle of the forks 33. The reach lever 46 is a lever for a cargo handling operation, which is for changing a reach amount of the forks 33 (a displacement in the forward/backward direction X). The steering wheel 47 is for changing a direction of the rear wheel 22L. The operator enters and leaves the cab 40 from a boarding gate provided in the rear of the vehicle main body 10.

Figure 3A:
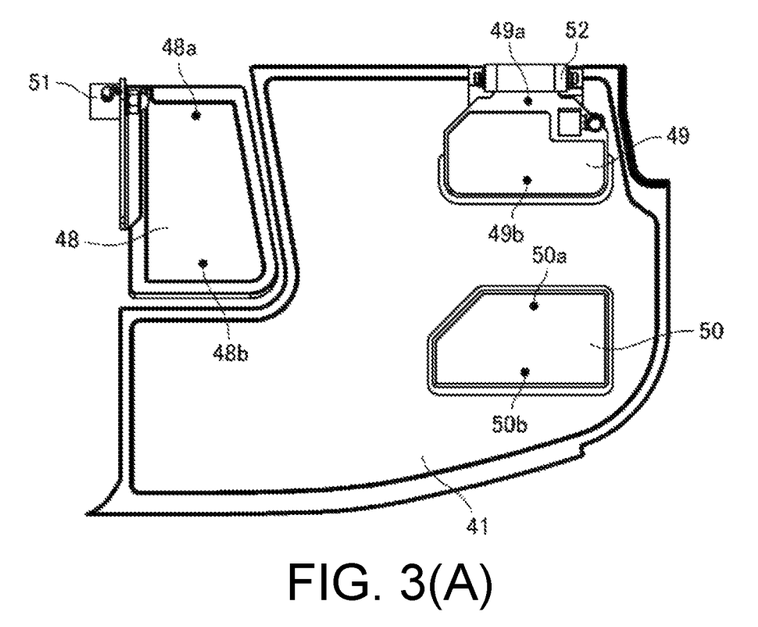
Figure 3B:
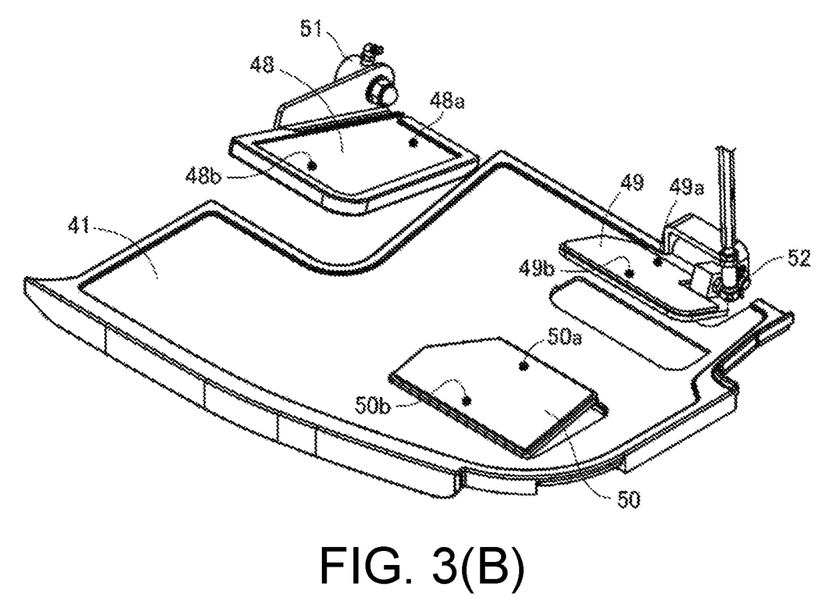

As illustrated in FIGS. 2, 3(A) and 3(B), a brake pedal 48 corresponding to the "first foot pedal" of the present invention, a first presence pedal 49 corresponding to the "front foot pedal" of the present invention, and a second presence pedal 50 corresponding to the "rear foot pedal" of the present invention are provided on the boarding floor 41. The brake pedal 48 is disposed at a position corresponding to the left foot FL of the operator who assumes a basic posture in the cab 40. The first presence pedal 49 is disposed at a position corresponding to a toe portion of the right foot FR of the operator. The second presence pedal 50 is disposed at a position corresponding to a heel portion of the right foot FR of the operator.

The brake pedal 48 and the first and second presence pedals 49 and 50 are separated from each other in the leftward/rightward direction Y. The first presence pedal 49 and the second presence pedal 50 are separated from each other by a predetermined amount in the forward/backward direction X. That is, in the present embodiment, it can be said that the second foot pedal 102 (see FIGS. 8(A)-8(C)) in the conventional forklift is divided into two parts in the forward/backward direction X.

The brake pedal 48 has the same configuration as the first foot pedal 101 in the conventional forklift. To be specific, the brake pedal 48 is made to be pivotable relative to the boarding floor 41 by a hinge 51 having a rotational axis extending in the leftward/rightward direction Y. The hinge 51 is provided at a portion 48a closer to the front of the brake pedal 48. The brake pedal 48 is biased by a spring or the like such that a portion 48b closer to the rear thereof is raised from the boarding floor 41 when the brake pedal 48 is not stepped on.

The first presence pedal 49 is made to be pivotable relative to the boarding floor 41 by a hinge 52 having a rotational axis extending in the leftward/rightward direction Y. The hinge 52 is provided at a portion 49a closer to the front of the first presence pedal 49. The first presence pedal 49 is biased by a spring or the like such that a portion 49b closer to the rear thereof is raised from the boarding floor 41 when the first presence pedal 49 is not stepped on.

The second presence pedal 50 is made to be pivotable relative to the boarding floor 41 by a hinge (not shown) having a rotational axis extending in the leftward/rightward direction Y. The hinge is provided at a portion 50b closer to the rear of the second presence pedal 50. The second presence pedal 50 is biased by a spring or the like such that a portion 50a closer to the front thereof is raised from the boarding floor 41 when the second presence pedal 50 is not stepped on.

When the brake pedal 48 and the first and second presence pedals 49 and 50 are stepped on by the operator, they are roughly parallel to the boarding floor 41. When the operator stops stepping on the brake pedal 48 and the first and second presence pedals 49 and 50, these pedals return to a state illustrated in FIG. 3(B).

Figure 4:
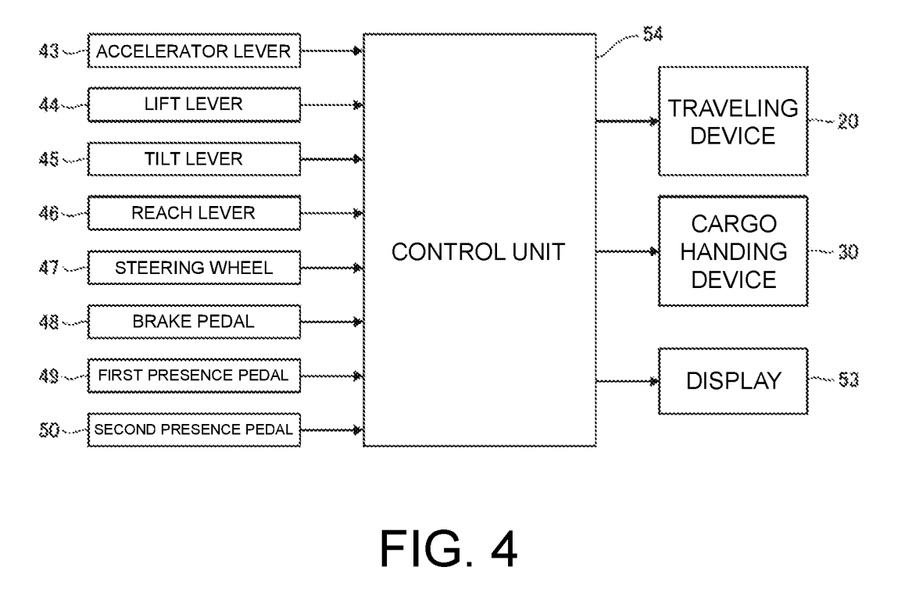
FIG. 4 is a control block diagram of the cargo handling vehicle according to the embodiment of the present invention.

The vehicle main body 10 further has a display 53 and a control unit 54. As illustrated in FIG. 4, the control unit 54 is electrically or mechanically connected to the accelerator lever 43, the lift lever 44, the tilt lever 45, the reach lever 46, and the steering wheel 47, and receives signals relevant to operation amounts thereof. The control unit 54 is electrically or mechanically connected to the brake pedal 48 and the first and second presence pedals 49 and 50, and receives signals relevant to a state in which these pedals are stepped on. The control unit 54 controls the traveling device 20, the cargo handling device 30, and the display 53 on the basis of the signals relevant to the received operation amounts and the received stepped states.

To be more specific, when the signal sent from the first presence pedal 49 side indicates that the "first presence pedal 49 is stepped on," the control unit 54 permits a hydraulic operation in the cargo handling device 30. In this case, when the operator operates the lift lever 44, the lift bracket 32 (the forks 33) is lifted/lowered according to the operation amount of the lift lever 44. This is also the same when the operator operates the tilt lever 45 and the reach lever 46. Meanwhile, when the signal indicates that the "first presence pedal 49 is not stepped on," the control unit 54 prevents the hydraulic operation in the cargo handling device 30. In this case, even when the operator operates the lift lever 44, the lift bracket 32 (the forks 33) is not lifted/lowered. In other words, the operation of the lift lever 44 is ignored. This is also the same when the operator operates the tilt lever 45 and the reach lever 46.

When the signals sent from the sides of the pedals 48, 49 and 50 indicate that "all the pedals 48, 49 and 50 are being stepped on," the control unit 54 permits traveling caused by the traveling device 20. In this case, when the operator operates the accelerator lever 43, the forklift 1 travels according to the operation amount of the accelerator lever 43. This is also the same when the operator operates the steering wheel 47. Meanwhile, when the signals indicate that "one of the pedals is not stepped on," the control unit 54 prevents traveling caused by the traveling device 20. In this case, even when the operator operates the accelerator lever 43, the forklift 1 does not travel. In other words, the operation of the accelerator lever 43 is ignored. This is also the same when the operator operates the steering wheel 47.

The operations of the control unit 54 are summarized in the following table.

TABLE 1

| Brake pedal | First presence pedal | Second presence pedal | Traveling | Hydraulic operation |
|---|---|---|---|---|
| ON/OFF | OFF | ON/OFF | Prevented | Prevented |
| OFF | ON | OFF | Prevented | Permitted |
| OFF | ON | ON | Prevented | Permitted |
| ON | ON | OFF | Prevented | Permitted |
| ON | ON | ON | Permitted | Permitted |

When the control unit 54 prevents traveling or the hydraulic operation, a message calling an operator's attention to a posture is displayed on the display 53.

Figure 5A:
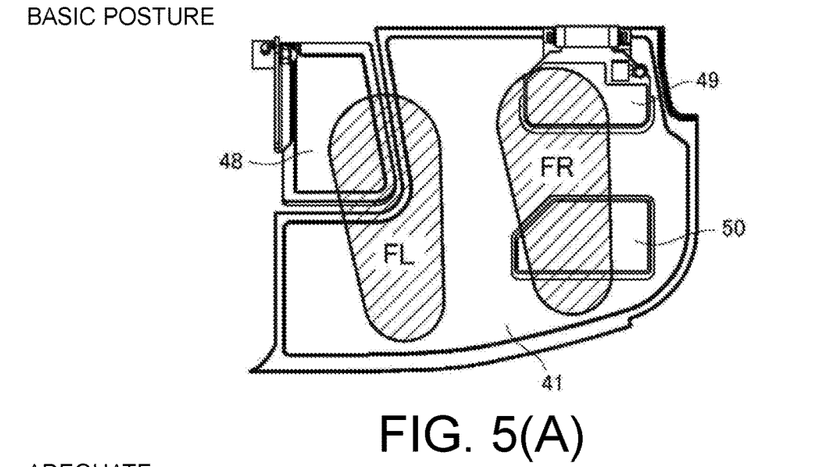
FIG. 5(A) illustrates a positional relation when the operator assumes a basic posture.
Figure 5B:
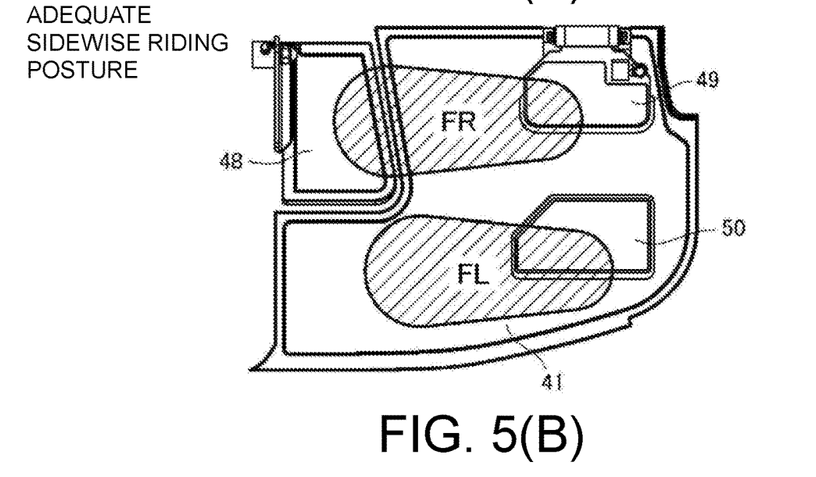
FIG. 5(B) illustrates a positional relation when the operator assumes an adequate sidewise riding posture.

When the operator assumes a basic posture, the brake pedal 48 is, as illustrated in FIG. 5(A), stepped on by the left foot FL, and the first and second presence pedals 49 and 50 are stepped on by the right foot FR. Therefore, in this case, the control unit 54 permits traveling and the hydraulic operation. When the operator assumes an adequate sidewise riding posture, the brake pedal 48 and the first presence pedal 49 are, as illustrated in FIG. 5(6), stepped on by the right foot FR, and the second presence pedal 50 is stepped on by the left foot FL. Therefore, in this case as well, the control unit 54 permits traveling and the hydraulic operation.

Figure 5C:
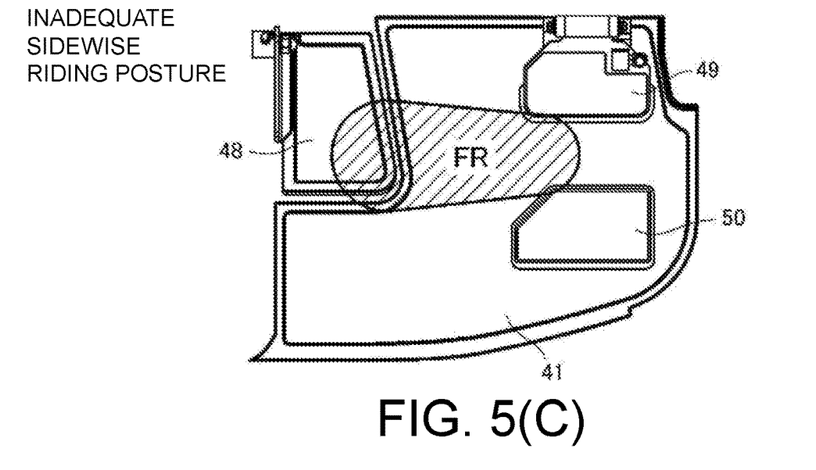
FIG. 5(C) illustrates a positional relation when the operator assumes an inadequate sidewise riding posture.

Meanwhile, when the operator gets aboard with one foot (the right foot FR) alone, that is, when the operator assumes an inadequate sidewise riding posture, all the pedals 48, 49 and 50 are not stepped on as illustrated in FIG. 5(C). Therefore, in this case, the control unit 54 prevents at least traveling. Thereby, dangerous traveling with the other foot (the left foot FL) of the operator kept protruding outside the vehicle is prevented.

At this time, when the first presence pedal 49 is not stepped on, the control unit 54 also prevents the hydraulic operation. Conversely, if only the first presence pedal 49 is stepped on, the control unit 54 permits the hydraulic operation. The reason for this is that the hydraulic operation in an inadequate posture is less dangerous compared to traveling in an inadequate posture. However, since it is not preferable that the hydraulic operation is permitted when an operator who is outside the vehicle only puts one foot on the boarding floor 41, the control unit 54 does not permit the hydraulic operation when only the second presence pedal 50 that is in front of the first presence pedal 49 is stepped on.

In the present embodiment, the arrangement of each of the pedals 48, 49 and 50, particularly a separation distance between the first presence pedal 49 and the second presence pedal 50 in the forward/backward direction X, is set on the basis of a size of the foot of a large operator regulated by ISO 3411 (a width of the foot including a shoe is 139 mm, and a length of the foot including the shoe is 311 mm) such that all the pedals 48, 49 and 50 cannot be stepped on with one foot (the right foot FR).

[Modifications]

There are various modifications of the present invention. Hereinafter, some of the modifications will be described.

Figure 6:
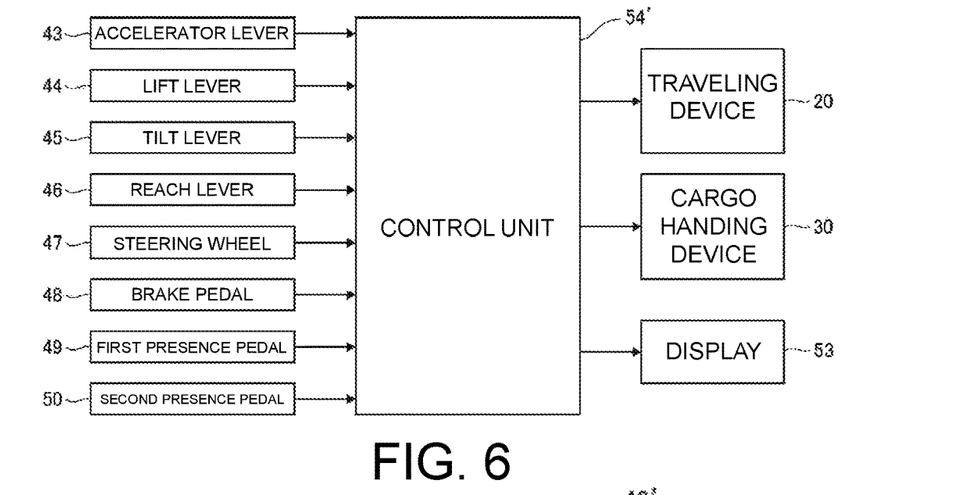
FIG. 6 is a control block diagram of a cargo handling vehicle according to a modification of the present invention.

The cargo handling vehicle according to the present invention may include a control unit 54' in place of the control unit 54 (see FIG. 6). Like the control unit 54, the control unit 54' permits the traveling caused by the traveling device 20 only when all the pedals 48, 49 and 50 are stepped on. Meanwhile, unlike the control unit 54, the control unit 54' permits the hydraulic operation if one or more of the pedals 48, 49 and 50 is stepped on.

Operations of the control unit 54' are summarized in the following table.

TABLE 2

| Brake pedal | First presence pedal | Second presence pedal | Traveling | Hydraulic operation |
|---|---|---|---|---|
| OFF | OFF | OFF | Prevented | Prevented |
| ON | ON/OFF | OFF | Prevented | Permitted |
| OFF | ON | ON/OFF | Prevented | Permitted |

TABLE 2-continued

| Brake pedal | First presence pedal | Second presence pedal | Traveling | Hydraulic operation |
|---|---|---|---|---|
| ON/OFF | OFF | ON | Prevented | Permitted |
| ON | ON | ON | Permitted | Permitted |

Figure 7A:
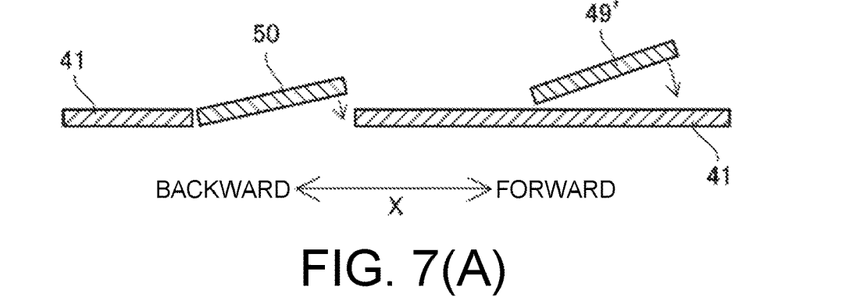
FIGS. 7(A)-7(C) are schematic sectional views of a boarding floor portion of the cargo handling vehicle according to the modification of the present invention.
Figure 7B:
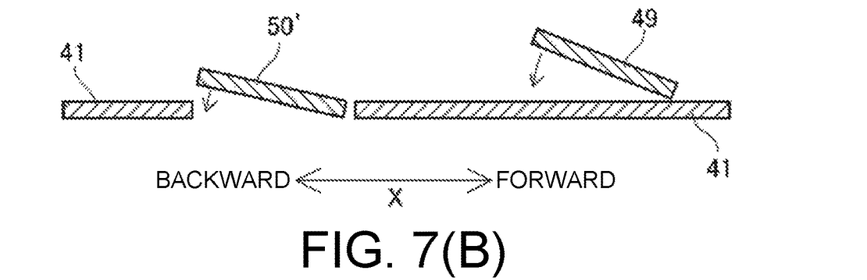
Figure 7C:
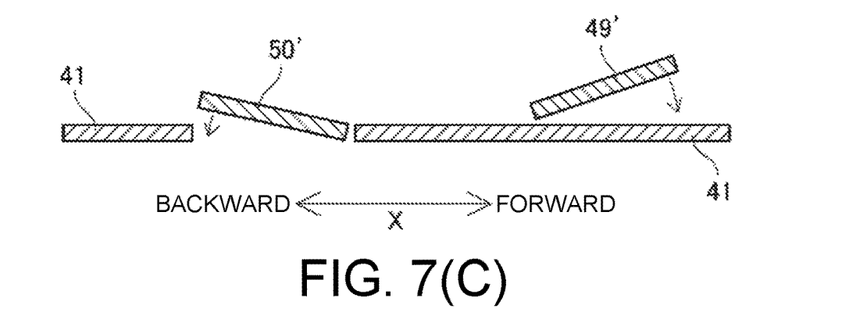

Like a first presence pedal 49' illustrated in FIGS. 7(A) and 7(C), the first presence pedal may be made to be pivotable relative to the boarding floor 41 by a hinge (not shown) provided at a rear portion thereof. Like a second presence pedal 50' illustrated in FIGS. 7(B) and 7(C), the second presence pedal may be made to be pivotable relative to the boarding floor 41 by a hinge (not shown) provided at a front portion thereof.

The invention claimed is:

1. A stand-up riding type cargo handling vehicle comprising: a boarding floor which an operator boards; first and second foot pedals that are provided on the boarding floor, and a control unit that is connected to the first and second foot pedals,
wherein: the first foot pedal is disposed at a position corresponding to a left foot of the operator who gets aboard facing forward; the second foot pedal is disposed at a position corresponding to a right foot of the operator who gets aboard facing forward, and is divided into a front foot pedal and a rear foot pedal in a forward/backward direction; the front foot pedal and the rear foot pedal are separated by a predetermined amount in the forward/backward direction, and the control unit permits or prevents traveling of the cargo handling vehicle on the basis of a state in which the first foot pedal, the front foot pedal and the rear foot pedal are stepped on; and
the control unit permits a hydraulic operation of the cargo handling vehicle in a case in which the front foot pedal is stepped on, and prevents the hydraulic operation in cases other than this case.

2. The stand-up riding type cargo handling vehicle according to claim 1, wherein the control unit permits traveling of the cargo handling vehicle in a case in which all of the first foot pedal, the front foot pedal, and the rear foot pedal are stepped on, and prevents traveling in cases other than this case.

3. The stand-up riding type cargo handling vehicle according to claim 2, wherein the front foot pedal and the rear foot pedal are made to be pivotable relative to the boarding floor by hinges, each of which has a rotational axis extending in a leftward/rightward direction.

4. The stand-up riding type cargo handling vehicle according to claim 3, wherein one of the hinges is provided at a front portion of the front foot pedal, and the other hinge is provided at a rear portion of the rear foot pedal.

5. The stand-up riding type cargo handling vehicle according to claim 3, wherein one of the hinges is provided at a rear portion of the front foot pedal, and the other hinge is provided at a front portion of the rear foot pedal.

6. The stand-up riding type cargo handling vehicle according to claim 3, wherein the hinges are respectively provided at front portions of the front and rear foot pedals.

7. The stand-up riding type cargo handling vehicle according to claim 3, wherein the hinges are respectively provided at rear portions of the front and rear foot pedals.

8. The stand-up riding type cargo handling vehicle according to claim 1, wherein the front foot pedal and the rear foot pedal are made to be pivotable relative to the boarding floor by hinges, each of which has a rotational axis extending in a leftward/rightward direction.

9. The stand-up riding type cargo handling vehicle according to claim 8, wherein one of the hinges is provided at a front portion of the front foot pedal, and the other hinge is provided at a rear portion of the rear foot pedal.

10. The stand-up riding type cargo handling vehicle according to claim 8, wherein one of the hinges is provided at a rear portion of the front foot pedal, and the other hinge is provided at a front portion of the rear foot pedal.

11. The stand-up riding type cargo handling vehicle according to claim 8, wherein the hinges are respectively provided at front portions of the front and rear foot pedals.

12. The stand-up riding type cargo handling vehicle according to claim 8, wherein the hinges are respectively provided at rear portions of the front and rear foot pedals.

* * * * *